(12) United States Patent
Burt et al.

(10) Patent No.: US 7,430,109 B2
(45) Date of Patent: Sep. 30, 2008

(54) ELECTRICAL DEVICE INCLUDING BATTERY PACK AND METHOD OF MAKING THE SAME

(75) Inventors: Harvey F. Burt, Minneapolis, MN (US); Jason L. Klassen, St. Louis Park, MN (US); Eric E. Sly, Cologne, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 85 days.

(21) Appl. No.: 10/986,454

(22) Filed: Nov. 12, 2004

(65) Prior Publication Data

US 2005/0242769 A1 Nov. 3, 2005

Related U.S. Application Data

(60) Provisional application No. 60/519,367, filed on Nov. 12, 2003, provisional application No. 60/519,344, filed on Nov. 12, 2003, provisional application No. 60/519,470, filed on Nov. 12, 2003.

(51) Int. Cl.
*G06F 1/16* (2006.01)
(52) U.S. Cl. .................................................. 361/679
(58) Field of Classification Search ................... 361/679
See application file for complete search history.

(56) References Cited

U.S. PATENT DOCUMENTS

2003/0162083 A1* 8/2003 Sakuma et al. ................ 429/61

* cited by examiner

*Primary Examiner*—Lisa Lea-Edmonds
(74) *Attorney, Agent, or Firm*—Steptoe & Johnson

(57) ABSTRACT

An electronic device according to an embodiment of the present invention may include a chassis configured to house electronics. The chassis of an electronic device may include a first rail and a second rail substantially parallel to the first rail. The first rail and the second rail may be coupled to the chassis. The first rail may have a first cutout and a second cutout. The second rail may include a third cutout and a fourth cutout. The invention according may also include a housing. This housing may be configured to be removably coupled to the chassis. The housing may include a first side having a first protrusion and a second protrusion. The housing may also include a second side having a third protrusion and a fourth protrusion. The first recess may be configured to receive one of the first protrusion and the second protrusion. The second recess may be configured to receive one of the third protrusion and the fourth protrusion. Thus the housing may be slidable in a substantially lateral motion under the first rail and the second rail.

17 Claims, 4 Drawing Sheets

ELECTRICAL DEVICE INCLUDING BATTERY PACK AND METHOD OF MAKING THE SAME

CROSS REFERENCE TO RELATED APPLICATIONS

This application is a non-provisional application under 35 U.S.C. §119(e) and hereby claims priority to U.S. Provisional Application Nos. 60/519,367, 60/519,344, and 60/519,470, each of which was filed on Nov. 12, 2003, and each of which are hereby incorporated by reference in their entirety.

FIELD OF THE INVENTION

The invention relates to battery housings for electronic devices. More particularly, the present invention relates to chassis and battery housings that are configured to mate with one another in multiple configurations.

BACKGROUND OF THE INVENTION

Wireless devices are generally known in the art. While some electronic wireless devices receive power from energy sources such as solar power or from mobile generators, many wireless devices receive power from batteries. There are a number of different commercially-available battery types, such as, for example, zinc-carbon batteries, alkaline batteries, lithium-iodide batteries, lead-iodide batteries, lead-acid batteries, nickel-cadmium batteries, nickel-metal hydride batteries, lithium-ion batteries, zinc-air batteries, zinc-mercury oxide batteries, silver-zinc batteries, and metal-chloride batteries. Each of these batteries are examples of the types of batteries that may be used with various electronic devices.

In electronic devices, particularly devices that are intended to be handled by a user or otherwise moved from one location to another, the batteries may be stored within the device itself. This may typically be performed using various biasing members to effectively pin, for example, a standard alkaline battery within the electronic device. Traditional devices may also include a door or some other means for holding the batteries within the device. Typical means for holding the batteries within the electronic device may include doors with hinges and a locking mechanism to prevent the door from opening inadvertently. Alternatively, pins or notches may be disposed to be accepted by corresponding holes in the electronic device at one end of the door and the other end of the door may include a biasing member such as, for example, a leaf spring to hold the door in place.

In addition to these doors, other means for securing batteries to electronic devices have been used in the prior art. This has become more commonplace with the development of rechargeable battery technology in addition to battery-powered devices that require increasing amounts of power for longer periods of time. Currently, batteries may be slid into a receiving port on an electronic device configured to receive the battery. Typically, the battery is slid along the length of a track until it is in electrical connection with the terminals of the electronic device and thereby configured to receive power from the battery. This type of battery engagement stricture may be disadvantageous in situations in which batteries may need to be changed in tight working environments. In this case, the user of the electronic device may not be able to slide the battery out of the track and therefore, the battery may not be changed while the device is in the close working environment. This will require the expenditure of time and effort to remove the electronic device from the close working environment to change the battery and then reposition the electronic device back into the environment.

SUMMARY OF THE INVENTION

An electronic device according to an embodiment of the present invention may include a chassis configured to house electronics or electronic devices. These electronics may be, for example, battery powered electronics. The electronics may be configured to test another electronic device for a characteristic, such as, for example, voltage or current. The electronic device may also include a first rail and a second rail substantially parallel to the first rail. The first rail and the second rail may be coupled to the chassis. The first rail may have a first cutout and a second cutout. The second rail may include a third cutout and a fourth cutout. The invention according may also include a housing. This housing may be configured to be removably coupled to the chassis. The housing may include a first side having a first protrusion and a second protrusion. The housing may also include a second side having a third protrusion and a fourth protrusion. The first recess may be configured to receive one of the first protrusion and the second protrusion. The second recess may be configured to receive one of the third protrusion and the fourth protrusion. Thus the housing may be slidable in a substantially lateral motion under the first rail and the second rail. Motion in a vertical direction substantially perpendicular to the lateral motion may be prevented by the first rail and the second rail because they may be disposed over at least the first protrusion and the third protrusion.

A method according to the present invention may include providing a chassis configured to house electronics. Furthermore, the method may include providing a first rail including a first cutout and a second cutout. The first rail may be coupled to the chassis. A second rail may also be provided and may include a third cutout and a fourth cutout. The second rail may be coupled to the chassis and may be substantially parallel to and spaced apart from the first rail. A housing may also be provided and may have a first side and a second side. The first side of the housing may include a first protrusion and a second protrusion. The second side of the housing may include a third protrusion and a fourth protrusion. A track may be formed between the first rail and the chassis. A second track may be formed between the second rail and the chassis. This configuration may permit the housing to be slidably engaged with the chassis in one of three possible configurations.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference the to the Figures in which various embodiments of the present invention are shown. The subject matter of this disclosure may, however, be embodied in many different forms and should not be construed as being limited to the embodiments set forth herein.

Figure 1:
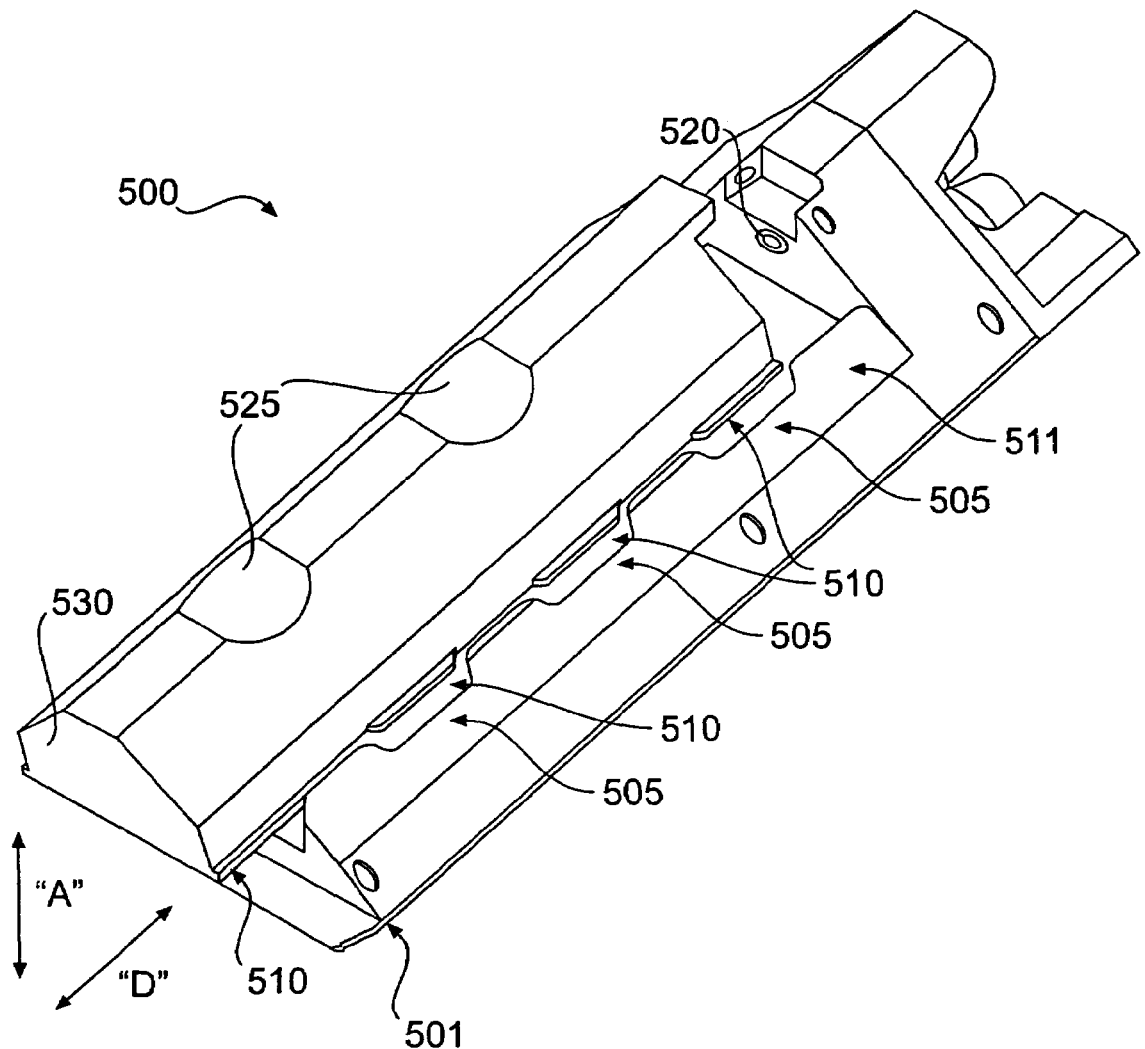
FIG. 1 shows an elevation view of an electronic device according to one embodiment of the present invention.

FIG. 1 shows an elevation view of an electronic device according to one embodiment of the present invention. The electronic device 500 may include a chassis 501. The chassis may be configured to house electronic components, such as, for example, circuitry. The circuitry may be configured to operate on battery power. The electronic device 500 may also include a housing 530. The housing 530 may be configured to house a battery. The housing 530 may be configured to house a number of different battery types, including, but not limited to lithium ion batteries or nickel-ion batteries. The chassis 501 may include an interface port 520 configured to interface with an associated power terminal (not shown) on the housing 530 to provide battery power to the electronic device 500.

According to one embodiment of the present invention, the housing may include a first rail 511 and a second rail (not shown). The first rail may be a separate part from the chassis 501 and may be affixed to the chassis 501 using adhesive, may be welded to the chassis 501 or attached to the chassis using other connecting means such as, for example, rivets, screws, bolts or other known fasteners. Alternatively, the first rail and the second rail may be integral to the chassis. The first rail 511 may include a first, second, and third cutout 505. These cutouts may be configured to receive a respective protrusion 510 on the housing 530. While three cutouts 505 are shown in FIG. 1, multiple cutout configurations and arrangements of cutouts may be used. For example, two cutouts 505 from the rail may be used. Alternatively, four or more cutouts 505 may be used in connection with the present invention. The housing 530 may include a first side and a second side (not shown). The first side of the housing may include a first protrusion and a second protrusion 510. While there are four protrusions 510 on one side of the housing are shown in FIG. 1, it is to be understood that this is merely an exemplary embodiment of the invention and three, five, six or more protrusions 510 may be used in connection with the present invention.

The housing 530 may also include grooves 525 thereby facilitating a more comfortable grip on the electronic device 500 when the device is being held by a user. In this way, the electronic device of the present invention may be ergonomic. As shown in FIG. 1, the housing 530 may be configured to be moved in a first direction "A" when the protrusions 510 on the housing 530 are aligned with the cutouts 505 in the rail 511. Once the protrusions 510 have been situated within the cutout 505, the housing 530 may be slid in a direction substantially perpendicular to "A," labeled as direction "D" on FIG. 6. In this manner, the housing may be coupled to the chassis. According to one embodiment of the present invention, a clip and ball stud (not shown) may be used to couple the housing 530 to the chassis 501. Alternatively, any type of fastener may be used to secure the housing 530 to the chassis 501, such as, for example, hook and loop fasteners, clamps, clips, thumbscrews or the like. Additionally, the housing 530 may be frictionally coupled to the chassis 501.

Figure 2:
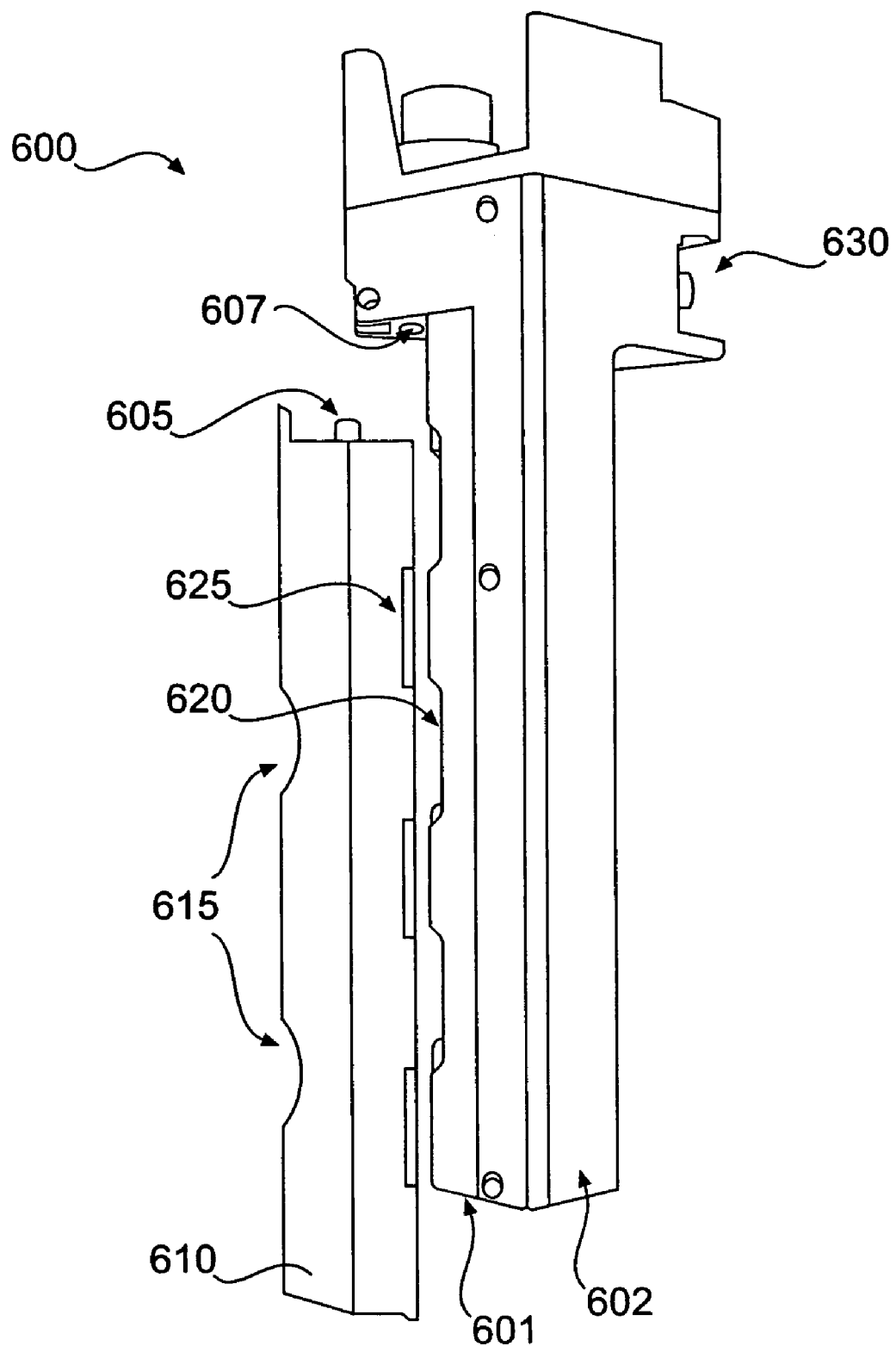
FIG. 2 shows a side view of an electronic device having a housing and a chassis according to the present invention.

FIG. 2 shows a side view of an electronic device having a housing and a chassis according to the present invention. As shown in FIG. 2, an electronic device 700 may include a chassis 602 and a first rail 601 and a second rail (not shown) coupled to the chassis 602. The rails may include a number of recesses or cutouts 620 formed therein. The cutouts may be configured to receive an associated protrusion 625 on the housing 610. The housing 610 may be configured to house a battery, which may supply power via a terminal 605 to the electronic device 600 via an interface 607. The housing 610 may include one or more grooves 615 to permit more comfortable handling of the housing 610. The electronic device 600 may also include an indicator interface 630 to permit, for example, the indicator protector described above to be installed on the electronic device.

The configuration of the present invention may be advantageous in that the housing 610 having a battery disposed therein may be coupled to the housing in one of a number of different manners. For example, the protrusions 625 may be slid up the length of the electronic device 600 starting at the bottom of the device until the housing 610 is in place. Alternatively, the protrusions 625 of the housing 610 may be positioned over the cutouts 620 in the rail 601 such that the protrusions 625 are placed in the track defined by the chassis 602 and the rail 601 and slid into place. Thus, the housing 610 may be engaged with the chassis 602 in one of, for example, four different manners. Regardless of the manner of mounting the housing 610 with the chassis 602, the battery should still be configured to engage the interface. This may permit the changing of the battery in a location where the sliding of the battery out of the unit may be difficult. While the embodiment illustrated in the present application is configured to have four different manners in which the housing 610 may be coupled to the chassis 602, it should be understood that the present invention is not limited to four engagement modes, and may include, for example, two engagement modes, three engagement modes or five or more engagement modes.

Figure 3:
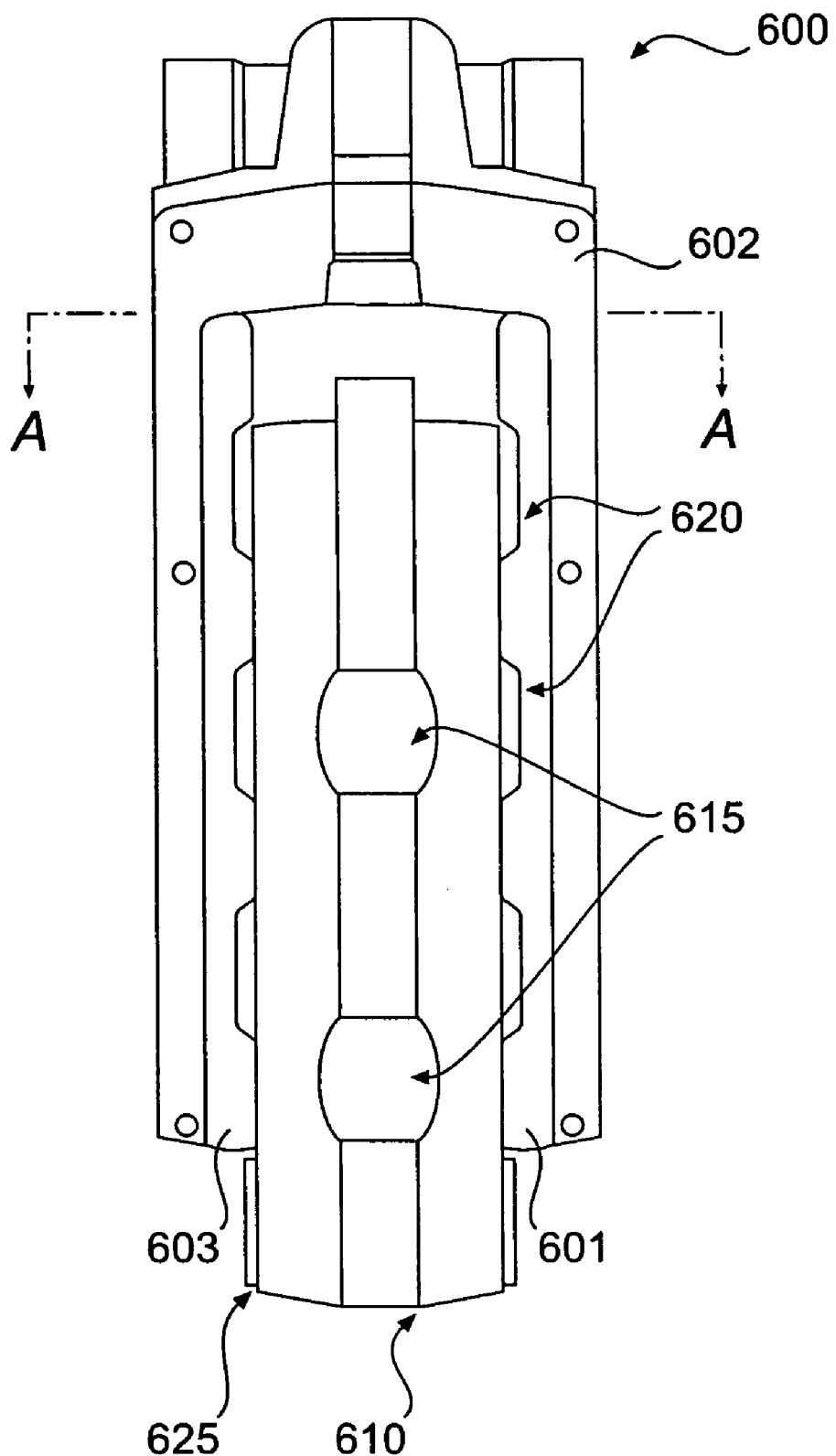
FIG. 3 shows a rear view of an electronic device according to one embodiment of the present invention.

FIG. 3 shows a rear view of an electronic device according to one embodiment of the present invention. As shown in FIG. 3, the electronic device 600 according to the present invention may include a first rail 601 and a second rail 603. Various cutouts may be made in the rails 601, 603. While the rails shown in FIG. 3 are symmetrical, there is no requirement that the rails in fact be symmetrical and they may be non-symmetrical if desired. The electronic device 610 may also include a housing 610 having a number of protrusions 620, 625 configured to be slid through a track defined by the first and second rails, 601, 603 and the chassis 602. The housing may also be configured to include a first and second groove 615 for ergonomic purposes.

Figure 4:
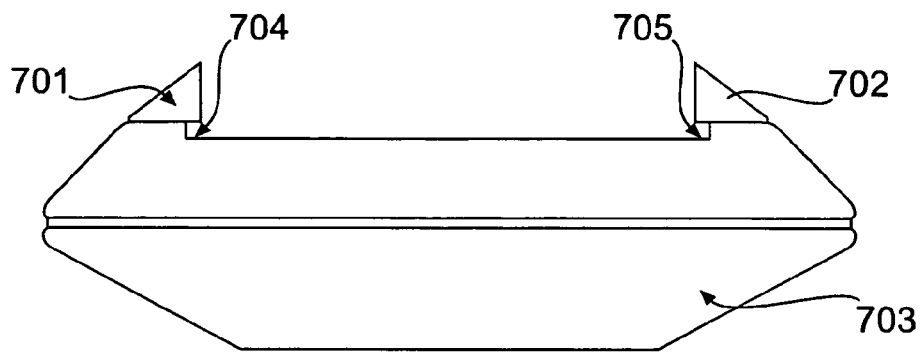
FIG. 4 shows a bottom view of an electronic device chassis according to one embodiment of the present invention.

FIG. 4 shows a bottom view of an electronic device chassis according to one embodiment of the present invention. As shown in FIG. 4, the chassis 703 may include a first rail 701 and a second rail 702. The first rail 701 and/or the second rail 702 may be integral to the chassis 703 or may be affixed by some fastening means as described above. The first rail 701 and the chassis 703 may be configured to define a first track 704, such that the protrusions on the housing may be slid through the track to engage with the chassis of the electronic device. The second rail 702 and the chassis 703 may be configured to form a second track 705 configured to receive the protrusions from the housing such that the housing may be slidably engaged with the chassis 703.

Figure 5:
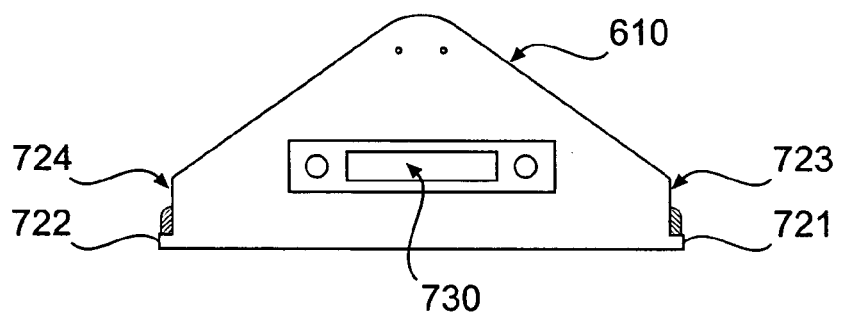
FIG. 5 shows a top view of a housing for use with an electronic device according to an embodiment of the present invention.
Figure 6:
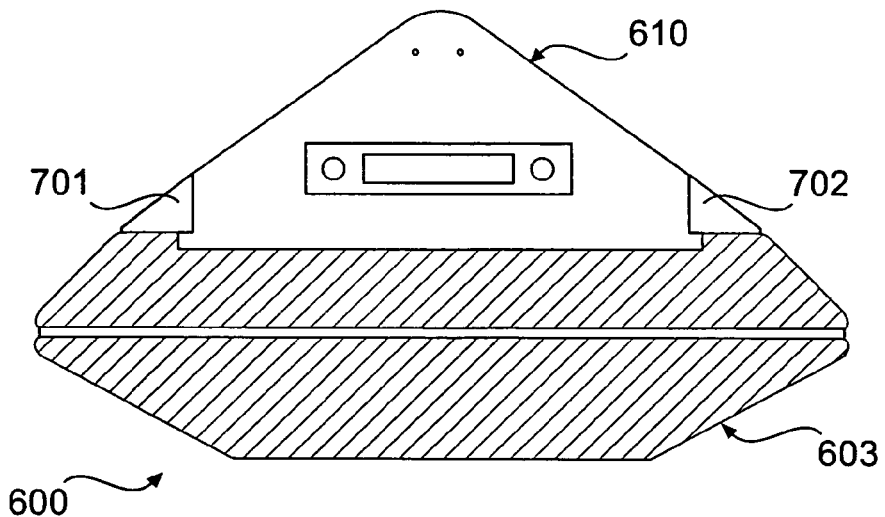
FIG. 6 shows a partial cross sectional view of the top of an electronic device according to an embodiment of the invention.

FIG. 5 shows a top view of a housing 610 for use with an electronic device according to an embodiment of the present invention. As shown in FIG. 5, the housing 610 may include a protrusion 721 on the first side 724 and a protrusion 722 on the second side 723. These protrusions 721, 722 may extend into the tracks described in FIG. 4 and as shown in FIG. 6, as described below. The housing 610 may include a terminal 730, which may supply battery power to the electronic device via an interface.

FIG. 6 shows a partial cross sectional view of the top of an electronic device 600 according to an embodiment of the invention. As shown FIG. 6, the housing 610 may be configured to be slidably engaged with the chassis 603. The rails 701, 702 may be configured to restrict the motion of the housing to a lateral direction as opposed to a vertical motion when the protrusions on the housing 610 and the cutouts in the rails 701, 702 are not in alignment.

Numerous other system configurations for a battery housing and chassis of an electronic device may be implemented based on the present disclosure. While the invention has been described with reference to specific preferred embodiments, it is not to be limited to these embodiments. For example, while certain embodiments of the invention were shown as being symmetrical, it should be understood that the protrusions and the recesses need not be symmetrical on each side of the electronic device and housing. Additionally, while the present invention was shown to be a voltage detector, it should be understood that any electronic device may include such a battery pack and housing. The invention may be modified or varied in many ways and such modifications and variations as would be obvious to one of skill in the art are within the scope and spirit of the invention and are included within the scope of the following claims.

We claim:

1. An apparatus configured to hold a battery, the apparatus comprising:
   a chassis, the chassis being configured to house electronics, the electronics being configured to receive power from a battery;
   a first rail and a second rail substantially parallel to the first rail, the first rail and the second rail being coupled to the chassis, the first rail including a first cutout and a second cutout, the first cutout and second cutout being spaced apart from one another, and the second rail including a third cutout and a fourth cutout, the third cutout and the fourth cutout being spaced apart from one another; and
   a housing configured to be removably coupled to the chassis, the housing having a first side and a second side, the first side of the housing having a first protrusion and a second protrusion, the second side of the housing having a third protrusion and a fourth protrusion, the first cutout being configured to receive one of the first protrusion and the second protrusion during vertical movement of the housing relative to the chassis and the third cutout is configured to receive one of the third protrusion and the fourth protrusion during vertical movement of the housing relative to the chassis, the housing being slidable in a substantially lateral motion under the first rail and the second rail, whereby motion in a vertical direction substantially perpendicular to the lateral motion is prevented by the first rail and the second rail being disposed over at least the first protrusion and the third protrusion;
   wherein the housing can engage the chassis by a first substantially vertical relative motion there between such that at least one of the protrusions lowers through at least one of the cutouts, followed by a horizontal relative motion there between such that the protrusions at least partially overlap with the rails, such overlap preventing further horizontal relative motion between the housing and the chassis.

2. The apparatus of claim 1, wherein the housing is hollow and configured to hold a battery.

3. The apparatus of claim 1, wherein the first rail includes a fifth cutout and the second rail includes a sixth cutout and the housing includes a fifth protrusion and a sixth protrusion.

4. The apparatus of claim 1, wherein the housing includes a first groove and a second groove.

5. The apparatus of claim 1, wherein the first rail and the second rail are integral to the chassis.

6. A method comprising:
   providing a chassis configured to house electronics;
   providing a first rail including a first cutout and a second cutout, the first rail being coupled to the chassis;
   providing a second rail including a third cutout and a fourth cutout, the second rail being coupled to the chassis and being substantially parallel to and spaced apart from the first rail; and
   providing a housing having a first side and a second side, the first side of the housing having a first protrusion and a second protrusion, the second side of the housing having a third protrusion and a fourth protrusion, whereby a first track is formed between the first rail and the chassis and a second track is formed between the second rail and the chassis, to thereby define at least three specific and distinct alternative configurations for the housing can slidably engage the chassis,
   wherein the housing can engage the chassis at any of the three configurations.

7. The method of claim 6, wherein the first rail includes a fifth cutout and the second rail includes a sixth cutout and first side of the housing has a fifth protrusion and the second side of the housing has a sixth protrusion, the housing being configured to be slidably engaged with the chassis in one of three possible configurations.

8. The method of claim 6, further comprising:
   providing a groove in the housing.

9. An apparatus configured to hold a member, comprising:
   a chassis, the chassis defining a member holding chamber, the chassis comprising:
      first and second rails mounted on opposite sides of the member holding chamber;
      said first rail including a first and second recesses;
      said second rail including a third and fourth recesses,
   a housing configured to be removably coupled to the chassis, comprising:
      first and second protrusions on one side of said housing; and
      third and fourth protrusions on an opposite side of said housing;
   said housing and chassis coupling to each other by a first substantially vertical relative movement whereby at least two of the protrusions pass through at least two of the recesses, and a second subsequent substantially lateral relative movement whereby said at least two of said protrusions overlap said rails,
   whereby said overlap prevents further vertical relative movement of said housing and said chassis.

10. The apparatus of claim 9, wherein said member holding chamber is configured to hold a battery.

11. The apparatus of claim 9, wherein said first rail includes a fifth recess, said second rail includes a sixth recess, and the housing includes fifth and sixth protrusions.

12. The apparatus of claim 9, wherein said first rail and said second rail are integrally formed with the chassis.

13. The apparatus of claim 9, wherein the housing may be vertically lowered into to said chassis and slidably engaged with said chassis in one of at least three possible configurations.

14. A method for sealing a chamber, comprising:
providing a chassis defining a member holding chamber, the chassis comprising:
first and second rails mounted on opposite sides of the member holding chamber;
the first rail including a first and second recesses;
the second rail including a third and fourth recesses,
providing a housing configured to be removably coupled to the chassis, comprising:
first and second protrusions on one side of the housing; and
third and fourth protrusions on an opposite the of said housing;
substantially vertically moving the housing and chassis relative to each other such that at least two of the protrusions pass through at least two of the recesses;
substantially laterally moving, after the vertically moving, the housing and the chassis relative to each other such that said at least two of said protrusions overlap said rails;
whereby overlap prevents further vertical relative movement of said housing and said chassis.

15. The method of claim 14, wherein said substantially vertically moving may occur in one of at least three possible configurations.

16. An apparatus configured to hold a member, comprising:
a chassis, the chassis defining a member holding chamber, the chassis comprising:
first and second rails mounted on opposite sides of the member holding chamber;
said first rail including at least first and second recesses;
said second rail including at least third and fourth recesses,
a housing configured to be removably coupled to the chassis, comprising:
at least first and second protrusions on one side of said housing; and
at least third and fourth protrusions on an opposite side of said housing;
said housing and chassis coupling to each other by a first substantially vertical relative movement whereby at least four protrusions pass through at least four recesses, and a second subsequent substantially lateral relative movement whereby said at least four of said protrusions overlap said rails,
whereby said overlap prevents further vertical relative movement of said housing and said chassis.

17. A method for sealing a chamber, comprising:
providing a chassis defining a member holding chamber, the chassis comprising:
first and second rails mounted on opposite sides of the member holding chamber;
said first rail including at least first and second recesses;
said second rail including at least third and fourth recesses,
providing a housing configured to be removably coupled to the chassis, comprising:
at least first and second protrusions on one side of said housing; and
at least third and fourth protrusions on an opposite side of said housing;
substantially vertically moving the housing and chassis relative to each other such that at least four protrusions pass through at least four of the recesses;
substantially laterally moving, after the vertically moving, the housing and the chassis relative to each other such that said at least four protrusions overlap said rails;
whereby overlap prevents further vertical relative movement of said housing and said chassis.

* * * * *